United States Patent [19]
Gerat

[11] Patent Number: 5,286,235
[45] Date of Patent: Feb. 15, 1994

[54] SPEED REDUCER OF THE CYCLOIDAL TYPE FOR ROBOTS AND OTHER INDUSTRIAL MANIPULATORS

[75] Inventor: Vincent Gerat, Saint-Jorioz, France

[73] Assignee: S.A. Des Etablissements Staubli, Faverges, France

[21] Appl. No.: 977,611

[22] Filed: Nov. 17, 1992

[30] Foreign Application Priority Data

Nov. 21, 1991 [FR] France ................ 91 14610

[51] Int. Cl.$^5$ ............................................. F16H 1/28
[52] U.S. Cl. ..................................... 475/162; 475/176
[58] Field of Search ............... 475/162, 176, 177, 178, 475/179, 348

[56] References Cited

U.S. PATENT DOCUMENTS

| | | | |
|---|---|---|---|
| 3,939,737 | 2/1976 | Horvath | 475/176 |
| 4,183,267 | 1/1980 | Jackson | 475/162 X |
| 4,440,044 | 4/1984 | Heller | 475/162 |
| 4,604,916 | 8/1986 | Distin, Jr. | 475/176 X |
| 4,715,656 | 12/1987 | Walk et al. | 475/162 X |

Primary Examiner—Leslie A. Braun
Assistant Examiner—Ryan W. Massey
Attorney, Agent, or Firm—Dowell & Dowell

[57] ABSTRACT

A speed reducer of the cycloidal type for robots and other industrial manipulators including a rotating ring which receives input at rapid speed is supported within a casing by a single end bearing which forms a pivot. The opposite end of the ring abuts against roller bearings associated with a pair of cams. Actuation fingers are oriented through housings created by openings in the cams and are connected to an output. The actuation fingers are arranged to be self-centered in the housings.

6 Claims, 3 Drawing Sheets

SPEED REDUCER OF THE CYCLOIDAL TYPE FOR ROBOTS AND OTHER INDUSTRIAL MANIPULATORS

BACKGROUND OF THE INVENTION

1. Field of the Invention

The present invention relates to speed reducers adapted to ensure angular actuation of the movable mobile members of robots, industrial manipulators, rotary machining plates and other like applications.

2. History of the Related Art

It is known that, in this type of apparatus, there is provided for each movable member a kinematic chain comprising an input shaft driven by an autonomous motor and connected, via a speed reducer, to an output shaft secured to the member in question. As the speed of rotation of the input shaft is much higher than that desired for the output shaft, reducers of the cycloidal type are ordinarily employed.

It will be recalled that a conventional cycloidal reducer comprises in principle at least one eccentric (in fact, two opposite eccentrics are most often employed in order to obtain a better balancing of forces), which is connected to the input shaft to ensure, by rotation, the control of a circular cam whose periphery is toothed in order to cooperate with a fixed toothing. The number of teeth of this fixed toothing is very slightly greater (in practice by one unit) than that of the periphery of the cam. With the cam are associated, in addition, actuation fingers which are carried by a plate angularly connected to the output shaft and which are engaged inside housings made in the cam (or, in the ordinary case of two parallel cams, in a housing defined by two conjugate openings of the two cams).

It will be understood that the primary motion applied by the input shaft to the eccentric causes the corresponding toothed cam to roll on the fixed outer toothing and thus to ensure, via the actuation fingers, drive of the output shaft in a ratio which depends on the number of teeth of the cam and on the difference of this number with respect to that of the fixed toothing, the cam backing by this difference for a revolution of the eccentric.

FIG. 1 of the accompanying drawings schematically shows the structure generally adopted for a cycloidal reducer with two eccentrics.

The fixed frame of the reducer in question is constituted by the assembly of two parts 1 and 2 of annular profile. This frame 1-2 supports an input shaft 3 which is driven in rotation by a motor shown schematically at 4 and on which is fitted a pinion gear 5. The latter meshes with the inner toothing 6a of a ring 6, disposed coaxially about frame 1-2 while being supported by two bearings 7 and 8 respectively mounted, the first, in a fixed cover 9 secured to the frame 1-2, the second, in a rotary plate 10. This plate 10 is carried by the frame 1-2 with the aid of a roller bearing 11 and it is provided, opposite the fixed plate 9, with an annular flange 10a forming an output shaft for the reducer.

The outer wall of ring 6 is machined in order to present two eccentric annular bearing surfaces 6b and 6c, the eccentricities being disposed opposite one another. On each of these bearing surfaces is mounted, with the interposition of a roller bearing 12, a cam 13 or 14, respectively, which is made with an annular profile and whose periphery is provided to be toothed so as to cooperate with the inner toothing of a fixed ring gear 15. The toothing 15a of the fixed ring gear 15 comprises a number of teeth very slightly greater (in fact by one or two units) than that of the toothings 13a and 14a of the cams 13 and 14, the cam being, to that end, made with a primitive diameter slightly smaller than the primitive diameter of the inner wall of the ring gear 15.

In order to ensure suitable guiding of the rotary plate 10 on the fixed parts of the assembly, the outer edge of the plate projects with respect to the ring gear 15 secured to the cover 9 and it receives a roller bearing 16 maintained in place with the aid of an annular cover 17.

Each of the toothed cams 13 and 14 is provided with a series of circular openings 13b, 14b. Once the openings of the two cams are brought into register with respect to one another, there is introduced in each of the housings thus defined an actuation finger constituted, in the conventional construction illustrated in FIG. 1, by a bushing 18 mounted idly, with a clearance as reduced as possible, on a cylindrical support or pin 19, which is carried by the plate 10.

Correct functioning of such a system implies employing parts which require a precise machining, followed by a very thorough grinding. Furthermore, it is virtually impossible for the torque to be simultaneously transmitted by a plurality of fingers 18-19, which leads to increasing the dimensions of the device.

It is an object of the present invention to overcome these drawbacks and to simplify the construction of the cycloidal reducers of the type shown, reduce the dimensions thereof and to improve the functioning thereof.

SUMMARY OF THE INVENTION

The reducer according to the invention is essentially noteworthy in that the eccentric-holder ring is maintained in the fixed frame by a single roller bearing provided at one of its ends in order to form a pivot, whilst the opposite end abuts against the roller bearings interposed between the eccentrics and the toothed cams which are in abutment against the fixed toothed ring gear via the toothings of the cams. Further the actuation fingers engaged in the housings defined by the cams are constituted by cylindrical members which are provided on their support a clearance which allows, during assembly, the self-centering of each of the members in its housing.

BRIEF DESCRIPTION OF THE DRAWINGS

The invention will be more readily understood on reading the following description with reference to the accompanying drawings, in which.

As indicated hereinabove.

DETAILED DESCRIPTION OF THE DRAWINGS

Figure 2:
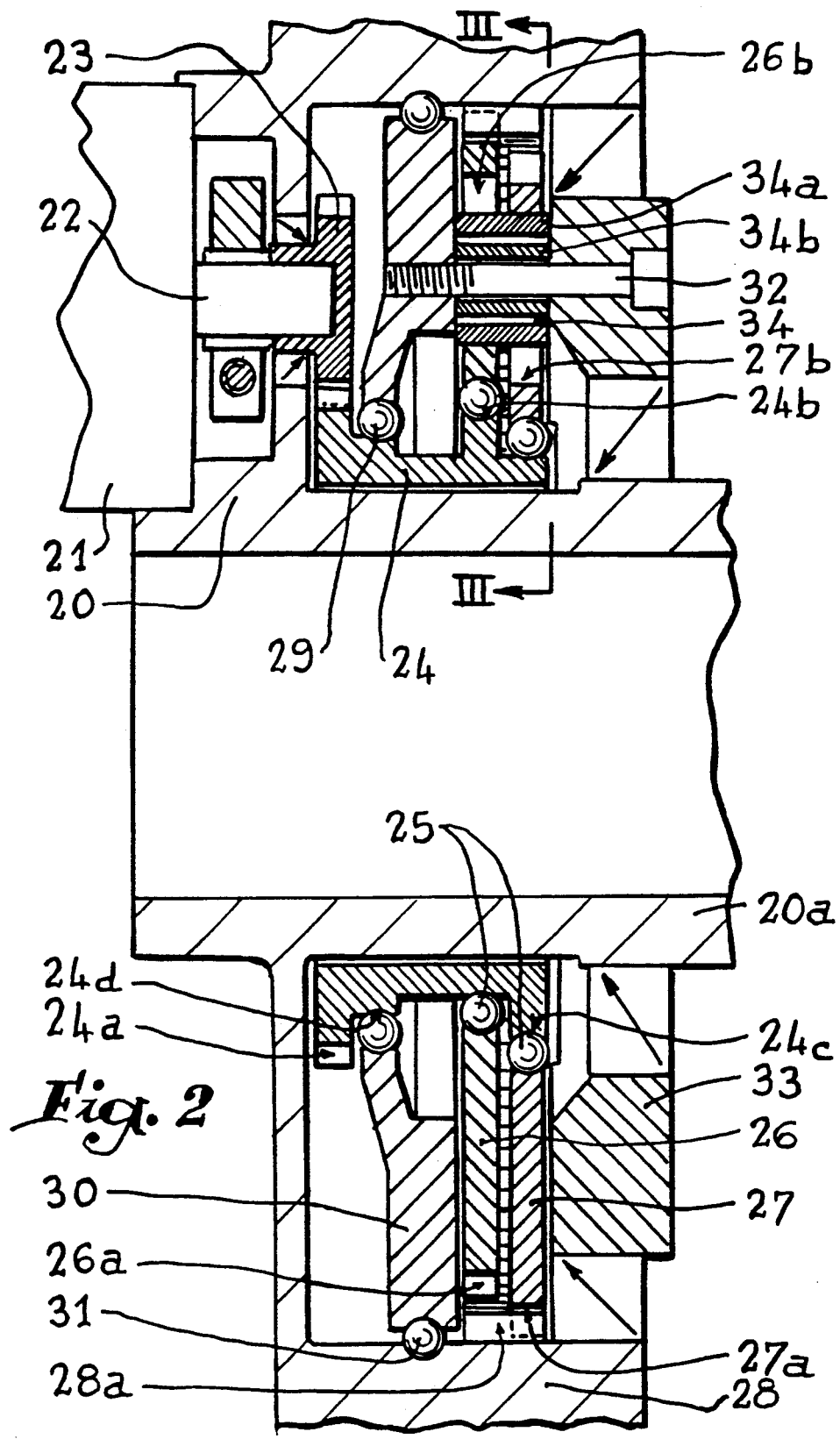
FIG. 2 shows, in the same way, the general structure of a reducer in accordance with the present invention.

Referring again to the drawings, reference 20 in FIG. 2 designates the frame or fixed housing of the reducer, which frame is equipped with a drive motor 21 on the shaft 22 of which is fitted a pinion gear 23; the gear 23 meshes with the rear toothing 24a of a ring 24. The ring 24 surrounds the central annular part 20a of the frame 20 and it includes, opposite the toothing 24a, two eccentric bearing surfaces 24b and 24c whose eccentricities are oriented 180° with respect to one another.

Figure 1:
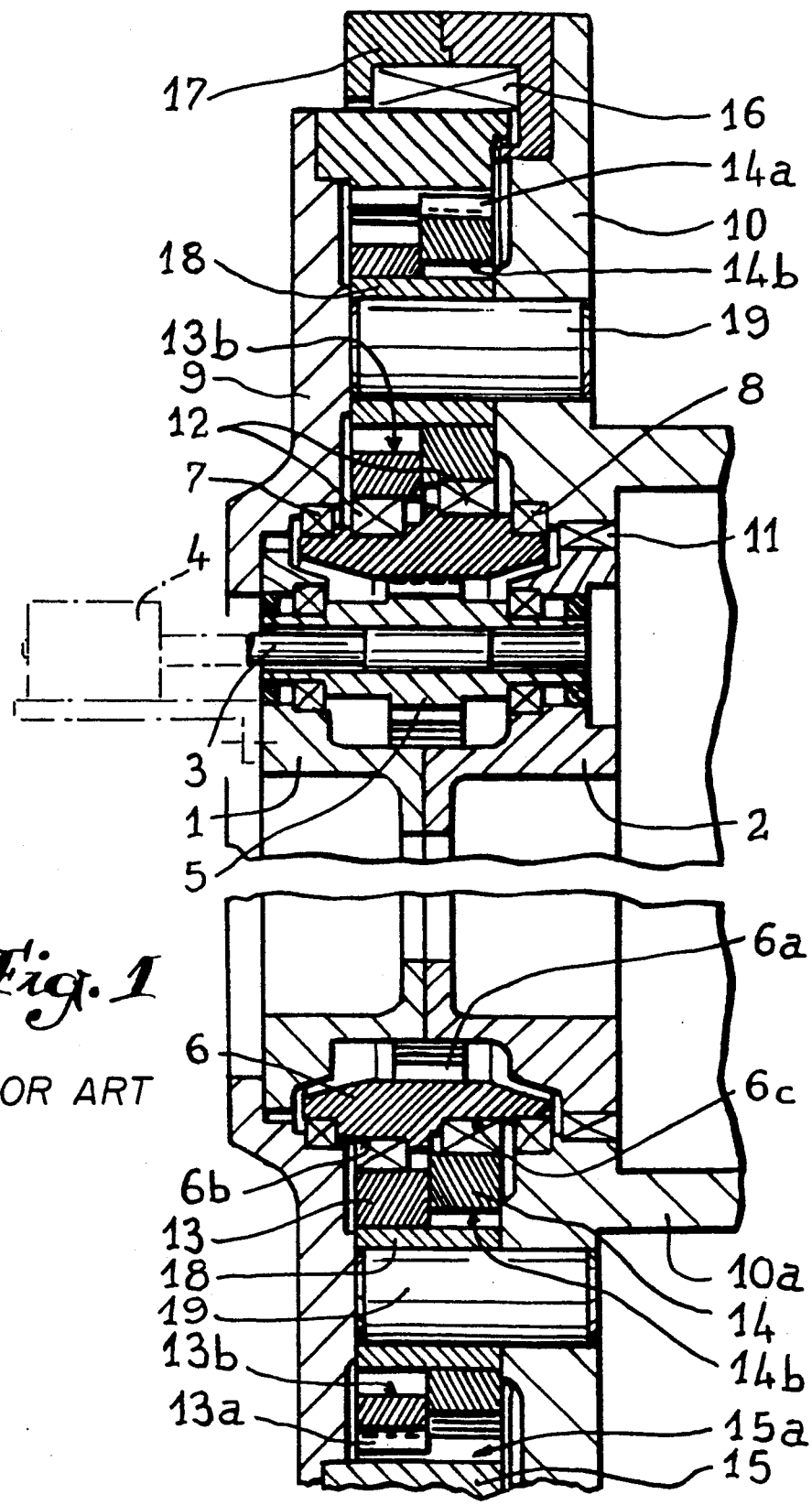
FIG. 1 is a schematic axial section illustrating the arrangement of a cycloidal reducer constructed in conventional manner.

As in the construction according to FIG. 1, each of the eccentric bearing surfaces or eccentrics 24b and 24c is provided with a roller bearing 25 for mounting a cam 26, 27, respectively, of which the periphery is toothed in order to cooperate with the inner toothing 28a of a ring gear 28, rigidly fixed to the frame 20 concentrically to the annular part 20a thereof. Of course, the toothing 28a comprises a number of teeth very slightly greater than that of each toothing 26a, 27a of the cams 26 and 27.

For mounting the ring 24 in the frame 20, a single roller bearing or bearing 29 is employed according to the invention, which is engaged on an annular bearing surface 24d made on the ring immediately level with the end toothing 24a. The outer track of this single roller bearing 29 abuts against the axial opening of a rotating disc 30 mounted in the frame 20 with the aid of a roller bearing 31.

Figure 3:
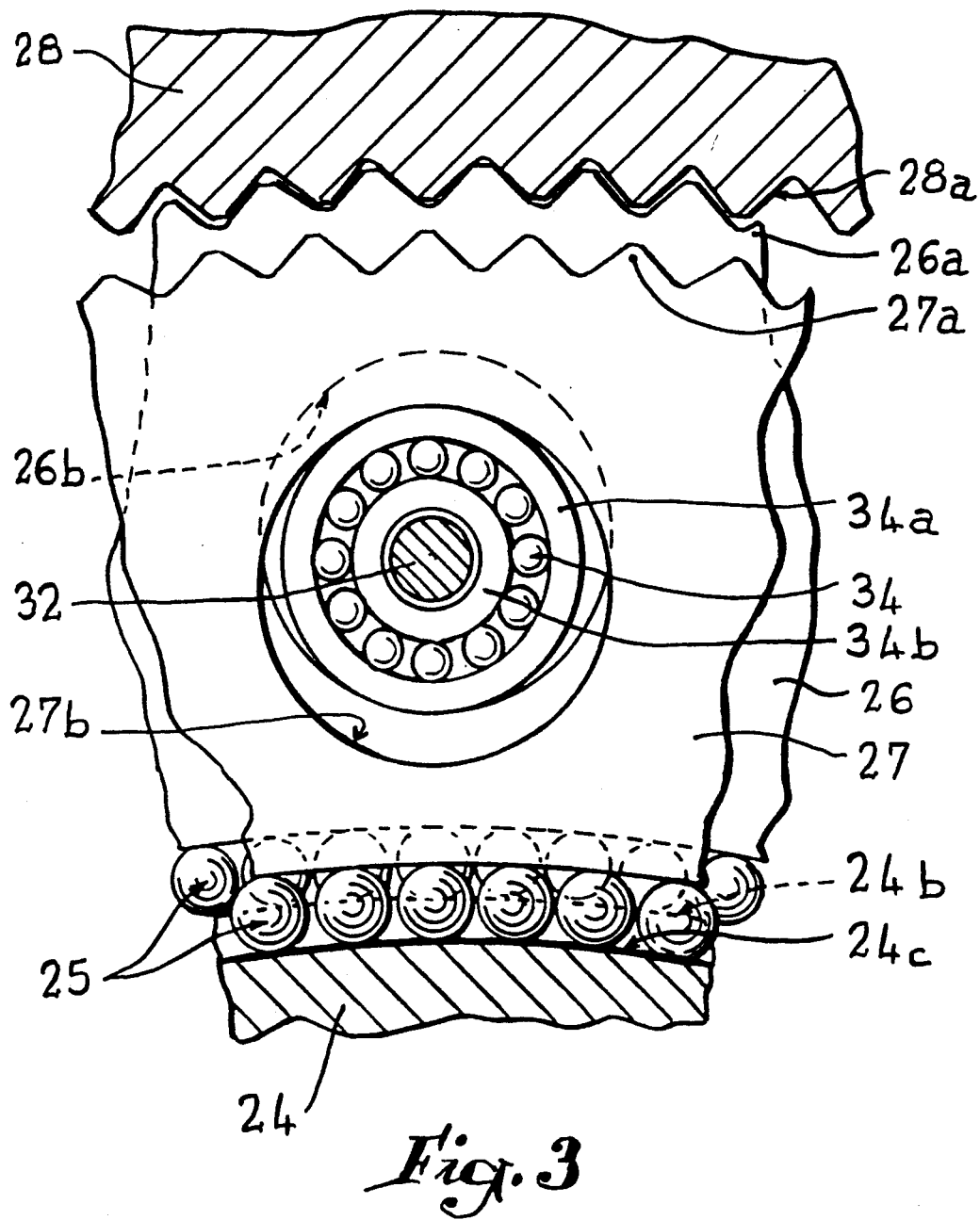
FIG. 3 is a transverse section on a larger scale along the plane indicated at III—III in FIG. 2.

Each cam 26 and 27 has a series of circular openings 26b, 27b therein (cf. FIG. 3), brought into register in order to form a corresponding series of housings for the actuation fingers of the reducer. Each of these fingers is constituted by a bolt 32 which is screwed laterally in the disc 30 and whose head abuts against a bushing 33 forming an output shaft for the reducer.

Between disc 30 and bushing 33, each bolt 32 supports a roller bearing 34 of which the outer track 34a is engaged in the housing defined by the openings 26b and 27b, while its inner track 34b is mounted with a noteworthy clearance on the bolt 32.

The general functioning of the reducer according to the invention is substantially identical to that of the apparatus described with reference to FIG. 1, namely the rotation of the ring 24 under the effect of the motor 21 produces, via the toothed cams 26 and 27 in mesh with the fixed ring gear 28, control of the fingers 32 34 and drive at slow speed of the bushing or output 33.

However, it will be understood that the uniqueness of the roller bearing 29 associated with the ring 24 allows a simplified construction of the assembly of the mechanism. The dimensions thereof are reduced, at the same time as the inertia of the parts which rotate at high speed is limited. In addition, functioning is improved, in that the single roller bearing 29 acts as a pivot for the ring 24 which abuts via the toothed cams 26 and 27 against the ring gear 28, avoiding any stress. The clearance available to the roller bearings 34 on their support 32 ensures, during assembly, self-centering of the actuation fingers 32-34 in their housing 26b-27b and allows this abutment of the ring 24 on the toothed cams without it being necessary to resort to a very precise machining followed by a close grinding.

It must, moreover, be understood that the foregoing description has been given only by way of example and that it in no way limits the domain of the invention which would not be exceeded by replacing the details of execution described by any other equivalents.

What is claimed is:

1. A speed reducer of the cycloidal type for robots and other industrial manipulators which is engagable between an input drive shaft and an output, the speed reducer comprising, a frame, an eccentric-holder ring drivingly engagable with the input shaft so as to rotate about a portion of said frame, said eccentric-holder ring having first and second end portions, said eccentric-holder ring having a pair of eccentric bearing surfaces formed in said first end portion thereof and a single bearing surface formed in said second end portion thereof, a pair of generally oppositely oriented cam members surrounding said eccentric-holder ring and having inner and outer surfaces, first bearing members disposed between said inner surfaces and said pair of eccentric bearing surfaces of said eccentric-holder ring, a plurality of spaced first teeth provided along said outer surface of each of said cam members, a ring gear means surrounding said cam members and having a plurality of spaced second teeth meshed with said first teeth of said cam members, the number of said second teeth being greater than the number of said first teeth of each cam member, said cams having openings therein defining housings, a number of actuating fingers mounted within said housings and having outer portions engagable with the output, said actuation fingers including a support which extends through said housings and cylindrical members mounted in said housings with a clearance space about said supports, and bearing means engagable with said single bearing surface formed in said second end portion of said eccentric-holder ring in such a manner that said eccentric-holder ring is pivotable relative to said bearing means.

2. The speed reducer of claim 1 wherein each of said cylindrical members includes a roller bearing means having inner and outer tracks, said inner track being mounted with the clearance space about said supports, a rotating disk mounted to said supports and having inner and outer portions, said bearing means engagable with said single bearing surface formed in said second end portion of said eccentric-holder ring including said inner portion of said rotating disk.

3. The speed reducer of claim 2 wherein each of said cylindrical members is rotatable about said supports.

4. The speed reducer of claim 3 including second bearing means engagable between said outer portion of said rotating disk and said ring gear means.

5. The speed reducer of claim 4 in which each of said supports includes a bolt, each of said bolts being threadingly engagable with said rotating disk, and each of said bolts having an outer head which is engagable with the output.

6. The speed reducer of claim 5 in which the output is formed as a cylindrical bushing.

* * * * *